(12) United States Patent (10) Patent No.: US 9,047,165 B1
Mosterman (45) Date of Patent: Jun. 2, 2015

(54) MULTIVERSION MODEL VERSIONING SYSTEM AND METHOD

(71) Applicant: The Mathworks, Inc., Natick, MA (US)

(72) Inventor: Pieter J. Mosterman, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 72 days.

(21) Appl. No.: 13/800,877

(22) Filed: Mar. 13, 2013

Related U.S. Application Data

(63) Continuation-in-part of application No. 13/705,917, filed on Dec. 5, 2012, now Pat. No. 8,887,126, which is a continuation of application No. 12/794,364, filed on Jun. 4, 2010, now Pat. No. 8,341,594, which is a continuation of application No. 10/888,705, filed on Jul. 8, 2004, now Pat. No. 7,739,655.

(51) Int. Cl.
*G06F 9/44* (2006.01)
*G06F 9/45* (2006.01)

(52) U.S. Cl.
CPC ........................................ *G06F 8/71* (2013.01)

(58) Field of Classification Search
USPC .......................................................... 717/105
See application file for complete search history.

(56) References Cited

U.S. PATENT DOCUMENTS

| | | | |
|---|---|---|---|
| 5,301,301 A * | 4/1994 | Kodosky et al. | 716/119 |
| 5,581,755 A | 12/1996 | Koerber et al. | |
| 5,586,304 A | 12/1996 | Stupek, Jr. et al. | |
| 5,706,510 A | 1/1998 | Burgoon | |
| 5,734,899 A | 3/1998 | Yoshizawa et al. | |
| 6,102,965 A | 8/2000 | Dye et al. | |
| 6,112,024 A * | 8/2000 | Almond et al. | 717/122 |
| 6,192,379 B1 | 2/2001 | Bekenn | |
| 6,246,972 B1 * | 6/2001 | Klimasauskas | 703/2 |
| 6,301,592 B1 | 10/2001 | Aoyama et al. | |
| 6,437,805 B1 * | 8/2002 | Sojoodi et al. | 715/763 |
| 6,449,624 B1 * | 9/2002 | Hammack et al. | 1/1 |
| 6,460,052 B1 | 10/2002 | Thomas et al. | |
| 6,493,594 B1 | 12/2002 | Kraml | |
| 6,678,882 B1 * | 1/2004 | Hurley et al. | 717/121 |
| 6,868,425 B1 | 3/2005 | Bergstraesser et al. | |

(Continued)

OTHER PUBLICATIONS

Collins-Sussman, Ben, et al., Version Control with Subversion: For Subversion 1.7 (Compiled from r4880), Nov. 2011, pp. 1-468.

(Continued)

*Primary Examiner* — Don Wong
*Assistant Examiner* — Marina Lee
(74) *Attorney, Agent, or Firm* — Cesari and McKenna, LLP; Michael R. Reinemann

(57) ABSTRACT

A version control unit may maintain separate version numbers for multiple traits of a single model. In particular, a number of model traits may be identified, such as a model behavior trait, a software architecture trait, a simulation trait and a code generation trait. Version information for each trait may be maintained separately for the single model. Groups of elements of the model, such as graphical objects, relationships among the objects, object parameters, model parameters, etc., may be mapped to the model traits. The version control unit may determine what model elements are changed since a prior version, and identify the model traits to which the changed model elements are mapped. Version numbers for these traits may be incremented, while version numbers for the other traits may be left unchanged.

18 Claims, 16 Drawing Sheets

(56) References Cited

U.S. PATENT DOCUMENTS

| | | | |
|---|---|---|---|
| 6,993,759 | B2 | 1/2006 | Aptus et al. |
| 7,024,631 | B1 | 4/2006 | Hudson et al. |
| 7,089,530 | B1 | 8/2006 | Dardinski et al. |
| 7,093,232 | B1 | 8/2006 | Chatzigianis et al. |
| 7,117,492 | B2 | 10/2006 | Ikeda et al. |
| 7,120,874 | B2 * | 10/2006 | Shah et al. .................... 715/733 |
| 7,120,896 | B2 | 10/2006 | Budhiraja et al. |
| 7,203,938 | B2 | 4/2007 | Ambrose et al. |
| 7,272,815 | B1 | 9/2007 | Eldridge et al. |
| 7,275,026 | B2 * | 9/2007 | Mani et al. ....................... 703/13 |
| 7,487,080 | B1 * | 2/2009 | Tocci et al. ..................... 703/22 |
| 7,509,244 | B1 * | 3/2009 | Shakeri et al. .................... 703/7 |
| 7,542,888 | B2 | 6/2009 | Critz et al. |
| 7,739,655 | B1 * | 6/2010 | Monteiro et al. ............. 717/105 |
| 7,904,876 | B1 | 3/2011 | Critz |
| 8,019,579 | B1 * | 9/2011 | Wey et al. .......................... 703/6 |
| 8,136,088 | B2 * | 3/2012 | Makowski et al. ........... 717/109 |
| 8,150,673 | B1 * | 4/2012 | Tocci et al. ..................... 703/22 |
| 8,229,871 | B2 | 7/2012 | Woolf et al. |
| 8,341,594 | B1 * | 12/2012 | Monteiro et al. ............. 717/105 |
| 8,756,044 | B2 * | 6/2014 | Mani et al. ....................... 703/13 |
| 2002/0029218 | A1 | 3/2002 | Bentley et al. |
| 2003/0016234 | A1 * | 1/2003 | Mani et al. .................... 345/621 |
| 2003/0016246 | A1 | 1/2003 | Singh et al. |
| 2003/0101025 | A1 | 5/2003 | Shah et al. |
| 2003/0158871 | A1 | 8/2003 | Fomenko |
| 2003/0231211 | A1 * | 12/2003 | Shah et al. .................... 345/771 |
| 2004/0046806 | A1 * | 3/2004 | Makowski et al. ........... 345/853 |
| 2004/0103393 | A1 | 5/2004 | Reddy et al. |
| 2004/0249867 | A1 * | 12/2004 | Kraiss et al. .................. 707/203 |
| 2005/0165793 | A1 * | 7/2005 | Mosterman ................... 707/100 |
| 2005/0257195 | A1 | 11/2005 | Morrow et al. |
| 2006/0235548 | A1 * | 10/2006 | Gaudette ......................... 700/83 |
| 2007/0179641 | A1 * | 8/2007 | Lucas et al. ..................... 700/83 |
| 2008/0092109 | A1 * | 4/2008 | Kinnucan et al. ............. 717/105 |
| 2008/0092111 | A1 * | 4/2008 | Kinnucan et al. ............. 717/105 |
| 2011/0161054 | A1 | 6/2011 | Woolf et al. |

OTHER PUBLICATIONS

Denckla, Ben et al. "Hierarchical Hybrid Block Diagrams", May 5, 2006, pp. 1-9.

Diedrich, et al., "Function block applications in control systems based on IEC 61804" ISA Transactions, vol. 43, Issue 1, Jan. 2004, pp. 123-131.

Kung, Stefan, et al., "TortoiseSVN: A Subversion Client for Windows, Version 1.7," Sep. 2012, pp. 1-215.

Mahapatra, Saurabh, et al., "Team-Based Collaboration in Model-Based Design," American Institute of Aeronautics and Astronautics, Aug. 2012, pp. 1-10.

Rouleau, Guy, "Simulink Projects: Collaborative Workflows and Model-Based Design," Guy and Seth on Simulink, The MathWorks, Inc., Sep. 2, 2011, pp. 1-7.

"Simulink, Dynamic System Simulation for Matlab, Using Simulink, Version 3," The MathWorks, Inc., Jan. 1999, pp. 1-605.

"Simulink User's Guide: R2012a," The MathWorks, Inc., Mar. 2012, pp. 1-2326.

"Simulink User's Guide: R2012b," The MathWorks, Inc., Sep. 2012, pp. 1-2839.

Zhao, J. Leon et al., "Building Workflow Engines for Commerce Logic Automation," Proceedings of the Americas Conference on Information Systems (AMCIS), Jan. 2000, pp. 558-561.

* cited by examiner

| | | | | Model Traits | | | |
|---|---|---|---|---|---|---|---|
| | 304 | 306 | 308 | 310 | | 312 | 314 316 |
| Model Elements | Behavior | Software Architecture | Simulation | Code Generation | Hardware Implementation | Model Requirements | Visual Representation |
| 302a Gain Parameter—Gain Block | x | | x | | | | |
| 302b Constant Parameter—Constant Block | x | | x | | | | |
| 302c Block spatial coordinates | | | | | | | x |
| 302d Block size | | | | | | | x |
| 302e Solver | x | | x | | | | |
| 302f Simulation Start Time | x | | x | | | | |
| 302g Simulation Stop Time | x | | x | | | | |
| 302h Block Reduction Optimization | | | x | x | | | |
| 302i Signal Storage Reuse Optimization | | | x | x | | | |
| 302j Hardware Device Vendor Name | | | | | x | | |
| 302k Hardware Device Type | | | | | x | | |
| 302l Processor Type | | | | x | | | |

| | Behavior | Software Architecture | Simulation | Code Generation | Hardware Implementation | Model Requirements | Visual Representation |
|---|---|---|---|---|---|---|---|
| Model Elements | | | | | | | |
| Number of Bits–Integer | | | | X | X | | |
| Number of Bits Character | | | | X | X | | |
| HDL Language Setting (VHDL or Verilog) | | | | | X | | |
| Generate Traceability Report Setting (on or off) | | | | X | X | | |
| Generate Resource Utilization Report Setting (on or off) | | | | X | X | | |
| Generate Stack Usage Report | | | | X | | | |
| Reset Type (Sync or Async) | | | | | X | | |
| Requirements Document Path Name | | | | | | X | |
| Link from Model Object to Requirements Document | | | | | | X | |
| Internal Requirements Document Link | | | | | | X | |

| Model Trait | Version No. |
|---|---|
| behavior | 1.7 |
| software architecture | 1.1 |
| simulation | 1.8 |
| code generation | 2.4 |
| hardware implementation | 2.1 |
| model requirements | 1.0 |
| visual representation | 1.0 |

FIG. 6

| Model Trait | Version No. |
|---|---|
| behavior | 1.7 |
| software architecture | 1.1 |
| simulation | 1.8 |
| code generation | 2.5 |
| hardware implementation | 2.2 |
| model requirements | 1.0 |
| visual representation | 1.0 |

| | Model Trait Versions | | | | | |
|---|---|---|---|---|---|---|
| Trait Configuration Number | Behavior | Software Architecture | Simulation | Code Generation | Hardware Implementation | Model Requirements |
| 1.0 | 1.0 | 1.0 | 1.0 | 1.5 | 1.0 | |
| 1.6 | 1.3 | 1.0 | 1.8 | 1.8 | 2.0 | 1.0 |
| 2.0 | 1.3 | 1.1 | 1.8 | 2.2 | 2.0 | 1.0 |
| 2.5 | 1.7 | 1.1 | 1.4 | 2.4 | 2.2 | 1.0 |

FIG. 12

MULTIVERSION MODEL VERSIONING SYSTEM AND METHOD

CROSS-REFERENCE TO RELATED APPLICATIONS

The present application is a continuation-in-part of commonly assigned, copending U.S. patent application Ser. No. 13/705,917, filed Dec. 5, 2012, by Ricardo Monteiro, Mojdeh Shakeri, Michael D. Tocci, Robert O. Aberg, and Pieter J. Mosterman for Version Control in Modeling Environments, which is a continuation of application Ser. No. 12/794,364, filed Jun. 4, 2010, by Ricardo Monteiro, Mojdeh Shakeri, Michael D. Tocci, Robert O. Aberg, and Pieter J. Mosterman for Version Control in Modeling Environments (now U.S. Pat. No. 8,341,594), which is a continuation of application Ser. No. 10/888,705, filed Jul. 8, 2004 by Ricardo Monteiro, Mojdeh Shakeri, Michael D. Tocci, Robert O. Aberg, and Pieter J. Mosterman for Version Control in Modeling Environments (now U.S. Pat. No. 7,739,655), which applications are hereby incorporated by reference in their entireties.

BRIEF DESCRIPTION OF THE DRAWINGS

The invention description below refers to the accompanying drawings, of which:

FIGS. 3A and 3B are a schematic illustration of an association of model elements to model traits in accordance with an embodiment of the invention;

FIG. 5 is a schematic illustration of version information for a model in accordance with an embodiment of the invention;

FIG. 6 is a schematic illustration of the version information of FIG. 5 following a change to the model;

FIG. 12 is a schematic illustration of an overall configuration management record in accordance with an embodiment of the invention.

DETAILED DESCRIPTION OF ILLUSTRATIVE EMBODIMENTS

Figure 1:
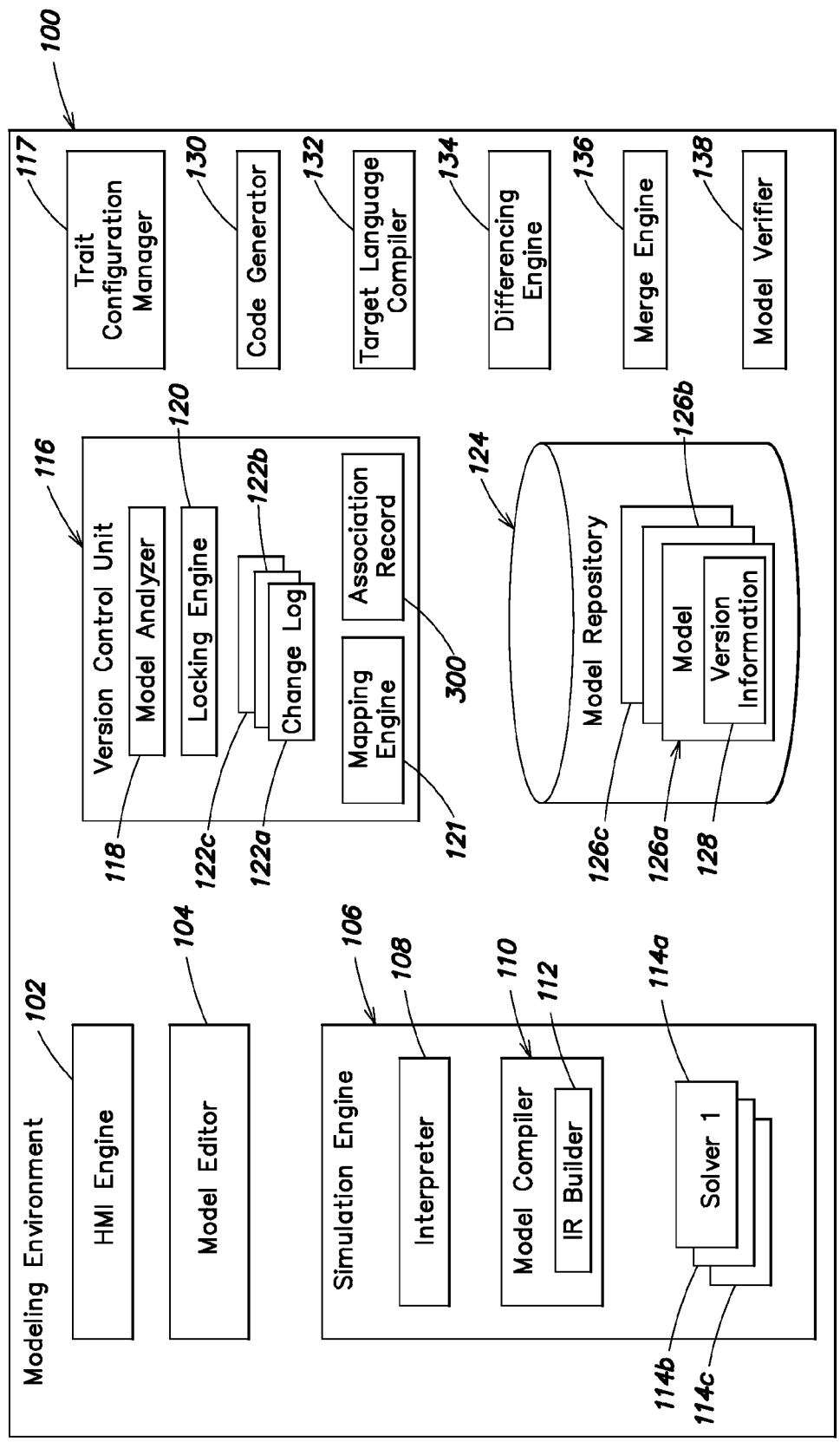
FIG. 1 is a partial, functional block diagram of a modeling environment in accordance with an embodiment of the invention.

U.S. Pat. No. 7,739,655 for Version Control in Modeling Environments to Ricardo Monteiro et al. describes a system and method for controlling the versions of models, such as graphical models. A model may be stored in a repository, and the model may be checked in and out of the repository, for example by a user wanting to make changes to the model. A source control system may automatically update version information for the model each time the model is checked into the repository, and this version information may be contained in the model. The version information for a model may include a model version designation, an interface version designation, and a change log that may include the dates and authors of changes to the model as well as change comments. The model version designation may reflect any changes in the model including changes to the content and interface of the model. The interface version designation may reflect only changes to the interface of the model.

To the extent the model includes a component that refers to another model, such as a graphical model reference block, the model also may contain version information for the model being referenced by the component. The version information for the model being referenced may include both a model version designation and an interface version designation.

The system compares the model version number and the interface version number of a referenced model with the model version number and interface version number of the parent model. If either of the version numbers does not match, an alert may be displayed to the user. The system may provide the user with a list of versions of the referenced model that are compatible with the parent model, and the user may select one of these compatible versions in place of the incompatible version of the referenced model.

The present invention relates to systems and methods for maintaining version control of graphical models that may have executable semantics and for the components and elements of such graphical models. More specifically, the system and method creates and maintains separate and independent versioning for a plurality of different traits of a graphical model. The system may include a modeling environment for creating and editing graphical models, a version control unit, a model repository for storing versions of models created or edited in the modeling environment, and a trait configuration manager. The version control unit may include a model analyzer for determining what changes have been made to a model since the last time it was saved, a locking engine, and a mapping engine.

A given graphical model may include a plurality of objects, such as blocks, and relationships may be established among the objects included in the model. The model may include a list of the plurality of objects included in the model and information identifying the relationships among the objects. In addition, at least some of the objects may have one or more object parameters. The model itself also may have one or more model parameters and one or more model configuration preferences. Furthermore, the model may include visual depiction information that specifies an appearance of the model, such as the appearance and location of the objects included in the model and the appearance and location of relationships among the objects, such as lines, arrows, etc. The objects included in the model, the information identifying the relationships among the objects, the object parameters, the model parameters, the model configuration preferences, and the visual depiction information may be changed, for example as a user edits or modifies the given model.

Different groups of objects, object relationship information, object parameters, model parameters, model configuration preferences and visual depiction information may relate to different traits of the graphical model. For example, a first group of objects, object relationship information, object parameters, model parameters, model configuration preferences and visual depiction information may concern the behavior of the model. A second group of objects, object relationship information, object parameters, model parameters, model configuration preferences and visual depiction information may concern the software architecture of the model. A third group may concern the manner in which the model is simulated, e.g., executed, for example by a simulation engine of the modeling environment. A fourth group may concern the manner in which code is generated from the model, for example by a code generator tool of the modeling environment. A fifth group may concern a hardware implementation of the model. A sixth group may concern verification of the model. Other groups may concern other traits of the graphical model, such as model requirements. Other traits may relate to different formalisms used in the given model, such as textual, discrete event, noncausal, etc.

In an embodiment, the version control unit is configured to maintain a separate and independent version number for each trait of the graphical model. For example, the version control unit may maintain a first version number for the behavior trait of the model, a second version number for the software architecture trait of the model, a third version number for the simulation trait of the model, a fourth version number for the code generation trait of the model, a fifth version number for the hardware implementation trait of the model, and a sixth version number for the verification trait. In particular, a determination may be made regarding which groups of objects, object relationship information, object parameters, model parameters, model configuration preferences and visual depiction information relate to or affect the various model traits. The mapping engine may define the association between the model traits and model elements, e.g., the various objects, object relationship information, object parameters, model parameters, model configuration preferences and visual depiction information, and this association may be stored at the version control unit in one or more association records.

The trait configuration manager may be configured to keep track of models formed from combinations of versions for the various traits. For example, an overall configuration number of 2.4 may identify a model that constitutes a combination of behavior trait version 5.6, software architecture trait version 3.0, simulation trait version 2.5, and so on. The overall configuration numbers may also be under version control.

The association between model traits and model elements may be implemented through a registration technique. For example, a tool of the modeling environment, such as the code generation tool, may register with the version control unit. As part of the registration process, the code generation tool may identify to the version control unit the particular group of model elements that relate to the code generation trait of the model, e.g., that, when changed, affect the code generation trait. In an embodiment, the association between model traits and model elements may be user configurable. For example, a user may register which model elements relate to various model traits.

When a user saves a model and/or checks a model into the version control unit, after having modified the model, the model analyzer may determine what changes were made to the model, and may determine which model traits are affected by those changes. The version control unit may only update the version numbers that are associated with the traits of the model that have been changed. The version control numbers associated with the traits of the model that have not been changed may retain their original version numbers. For example, if a model parameter affecting code generation is changed, the version control unit may increment the version number for the code generation trait of the model, but leave the version number for the behavior trait of the model unchanged. Yet, the overall configuration number for the model may be increased as well, e.g., from 2.4 to 2.5.

In a further embodiment, a human-machine interface (HMI) tool of the modeling environment may present a version window or dialog on a display. The version window may include entries for at least some of the plurality of version numbers established for the given model. The entries, moreover, may include graphical elements, such as drop down boxes, that allow a user to choose a selected version number for at least some of the traits of the given model. A user may thus check out from the version control unit a version of the given model that combines various selected version numbers for different traits of the given model. In addition, a user may check out a version of a graphical model that concerns just a single trait, such as the code generation trait. In an embodiment, if a user checks out a version associated with a particular trait, then that model trait becomes editable. If a user merely opens a version associated with a particular trait, then such model traits may be locked from editing by the user.

In other embodiments, different versions of model traits may be merged. In addition, different versions may be compared, and the differences between the versions identified, for example in a differencing report. One or more versions also may be locked from editing even if the version is checked out from the version control unit.

Modeling Environment

FIG. 1 is a partial, functional block diagram of a modeling environment 100. The modeling environment may have a plurality of modules or components. For example, the modeling environment 100 may include a human-machine interface (HMI) engine 102, a model editor 104, and a simulation engine 106. The simulation engine 106 may include an interpreter 108, a model compiler 110 that, in turn, may include one or more Intermediate Representation (IR) builders, such as IR builder 112, and one or more, and preferably a plurality, of solvers, such as solvers 114a-c. The HMI engine 102 may be configured to create and present one or more User Interfaces (UIs), such as Graphical User Interfaces (GUIs), that may be operated by users to initiate various model-related tasks, such as opening, creating and saving graphical models, opening, creating and saving textually specified programs, etc. The model editor 104 may be configured to perform the selected operations, such as open, create, edit, and save, in response to the user inputs. The simulation engine 106 may be configured to execute, e.g., compile and run or interpret, models, such as computer-generated simulation models, created or opened by the user, using a selected solver 114a-c. Exemplary solvers include one or more fixed-step continuous solvers, which may utilize integration techniques based on Euler's Method or Heun's Method, and one or more variable-step solvers, which may be based on the Runge-Kutta and Dormand-Prince pair. A non-exhaustive description of suitable solvers may be found in the *Simulink 7 User's Guide* from The MathWorks, Inc. (March 2013 ed.), which is hereby incorporated by reference in its entirety.

The modeling environment 100 may further include a version control unit 116 and a trait configuration manager 117. The version control unit 116 may include a model analyzer 118, a locking engine 120 and a mapping engine 121, and may store or have access to once or more change logs, such as change logs 122a-c and one or more association records, such as association record 300. The modeling environment 1500 may also include a model repository 124 configured to store one or more models, such as models 126a-c. Some of the models may include version information, such as the first model 126a, which includes version information 128.

The modeling environment 100 may further include a version control unit 116 and a trait configuration manager 117. The version control unit 116 may include a model analyzer 118, a locking engine 120 and a mapping engine 121, and may store or have access to once or more change logs, such as change logs 122a-c and one or more association records, such as association record 300. The modeling environment 100 may also include a model repository 124 configured to store one or more models, such as models 126a-c. Some of the models may include version information, such as the first model 126a, which includes version information 128.

Suitable code generators for use with the present invention include, but are not limited to, the Simulink Coder, the Embedded Coder, and the Simulink HDL Coder products from The MathWorks, Inc. of Natick, Mass., and the TargetLink product from dSpace GmbH of Paderborn Germany. Suitable target language compilers include the xPC Target™ tool from The MathWorks, Inc., and a C language compiler. However, other code generation systems and other compilers may be used. Suitable differencing and merge engines include the version compare utility in the Simulink Report Generator tool, and the 'merge' command from the MATLAB development environment both from The MathWorks, Inc., and the SimDiff and SimMerge tools from Ensoft Corp. of Ames, Iowa. A suitable model verifier includes the Simulink Verification and Validation tool from The MathWorks, Inc.

In an embodiment, the version control unit 116, the trait configuration manager 117, and other components of the modeling environment 100 may be implemented through one or more software modules or libraries containing program instructions pertaining to the methods described herein. The software modules may be stored in memory, such as a main memory, a persistent memory and/or on computer readable media, of a workstation or other data processing machine or device, and executed by one or more processing elements. Other computer readable media may also be used to store and execute these program instructions, such as non-transitory computer readable media, for example optical, magnetic, or magneto-optical media. In another embodiment, the version control unit 116 or portions thereof and/or the trait configuration manager 117 may comprise registers and combinational logic configured and arranged to produce sequential logic circuits. In alternative embodiments, various combinations of software and hardware, including firmware, may be utilized to implement the described methods.

In other embodiments, the version control unit 116, or one or more components thereof, and/or the trait configuration manager 117 may be separate from the modeling environment 100. In such cases, the version control unit 116 may be in communication with the modeling environment 100, e.g., through local or remote procedure calls, or an Application Programming Interface (API).

In an embodiment, the modeling environment 100 is a high-level modeling environment. Suitable high-level modeling environments include the MATLAB® and Simulink® technical computing environments from The MathWorks, Inc., as well as the Simscape physical modeling system and the Stateflow charting tool also from The MathWorks, Inc., the MapleSim physical modeling and simulation tool from Waterloo Maple Inc. of Waterloo, Ontario, Canada, the LabVIEW programming system and the NI MatrixX model-based design product both from National Instruments Corp. of Austin, Tex., the Visual Engineering Environment (VEE) from Agilent Technologies, Inc. of Santa Clara, Calif., the System Studio model-based signal processing algorithm design and analysis tool from Synopsys, Inc. of Mountain View, Calif., the SPW signal processing algorithm tool from Synopsis, a Unified Modeling Language (UML) system, a Systems Modeling Language (SysML) system, the System Generator system from Xilinx, Inc. of San Jose, Calif., and the graphical modeling systems described in U.S. Pat. No. 7,324,931 for Conversion of Model Components Into References and U.S. Pat. No. 7,991,598 for Method and System for Modeling a Mechanical System, which are hereby incorporated by reference in their entireties, among others. Models created in the high-level modeling environment may contain less implementation detail, and thus operate at a higher level than certain programming languages, such as the C, C++, C#, and SystemC programming languages.

Those skilled in the art will understand that the MATLAB® technical computing environment is a math-oriented, textual programming environment for digital signal processing (DSP) design, among other uses. The Simulink® technical computing environment is a model-based design environment for modeling and simulating dynamic systems, among other uses. The MATLAB® and Simulink® tools provide a number of high-level features that facilitate algorithm development and exploration, and support model-based design. Exemplary high-level features include dynamic typing, array-based operations, data type inferencing, sample time inferencing, and execution order inferencing, among others.

In another embodiment, a lower level programming language, such as the C, C++, and C# programming languages, among others, may be used to create one or more models.

Models constructed by the modeling environment 100 may include textual models, graphical models, and combinations of graphical and textual models. A given model may simulate, e.g., approximate operation of, a system. Exemplary systems include physical systems, such as weather systems, financial markets, plants, controllers, etc. A model may be executed in order to simulate the system being modeled, and the execution of a model may also be referred to as simulating the model.

Creation of Multiversioning System

Figure 2:
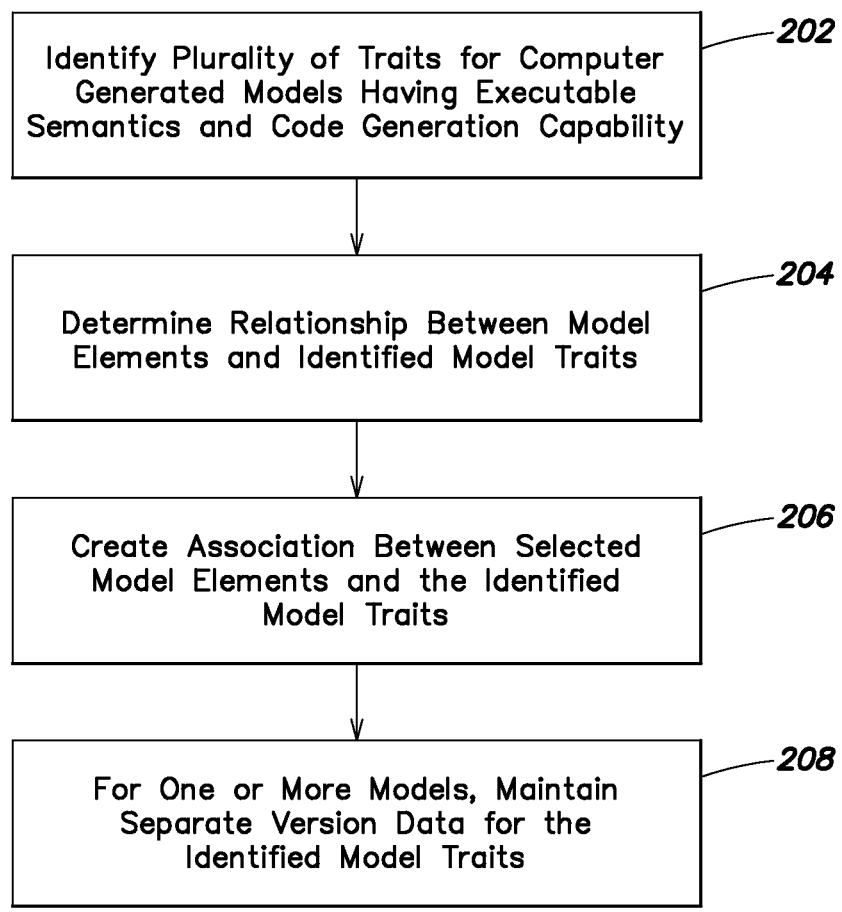
FIG. 2 is a flow diagram of a method in accordance with an embodiment of the invention.

FIG. 2 is a flow diagram of a method in accordance with an embodiment of the invention. In an embodiment, a plurality of traits may be identified or defined for models constructed and executed in the modeling environment 100, as indicated at block 202. In particular, a designer of the modeling environment 100 may identify a plurality of traits that apply to at least some of the models created and executed by the modeling environment 100. Exemplary traits include a behavior trait, a software architecture trait, a simulation or execution trait, a code generation trait, a hardware implementation trait, a model requirements trait, a report trait, a diagnostic trait, a visual representation trait, a model testing trait, and a verification trait, among others. The behavior trait concerns how a sequence of model values is generated, e.g., the various objects or blocks used in the model and their relationships, which numerical solvers to apply, what tolerances to use in approximations, whether to use a zero crossing location algorithm, whether to simulate single-tasking or multi-tasking execution, whether rate transitions should be automatically inserted, etc. The simulation or execution trait concerns how a model is executed by the simulation engine 106.

The code generation trait concerns how code, such as source code, is generated from a model by the code generator 130, e.g., code reuse, expression folding, loop unrolling, signal storage reuse, dead path elimination, parameter inlining, the use of pre-built math libraries, etc. The software architecture trait concerns the structure of code, such as source code, generated from a model, e.g., which functionality of the model should go into software functions, whether to allow reuse of these functions, the automatic naming scheme of the functions, the argument list, whether variables should be local or variable, whether variables or parameters are to be located in a main file or a header file, etc. The hardware implementation trait concerns generating a hardware description language (HDL) representation of a model, e.g., what algorithm to use for computing a square root, whether to try and minimize power consumption or resource usage, etc. The model requirements trait concerns design and/or testing requirements established for a model, and the relations or links between model elements and requirements. The verification trait concerns how a model is verified, e.g., by the model verifier 138. The diagnostic trait concerns how diagnostic testing of a model is performed, and what actions are taken in response to that testing, e.g., whether a particular model characteristic will cause an error, result in a warning or be ignored, whether algebraic loops are an error, whether a source block that inherits a sample time is an error, etc. The report trait concerns how a model should be presented in an electronic and/or hard copy report form, e.g., whether each subsystem should be on a separate page, whether a company note should be included on each page, whether version information should be on each page, etc.

A graphical model may include a plurality of elements that together define the model. These elements may include the objects that make up the model, such as blocks, subsystems and sub-models. These elements also may include relationships or interconnections among the objects, the parameters of those objects, the parameters of the model, parameters of signals in the model, and information about how a model should be visually depicted, e.g., on a screen or when printed, etc. For example, a model may include some number of Product, Gain, If-Else, Signal Builder, Data Store Read/Write, Finite Impulse Response (FIR), Infinite Impulse Response, Sum, Unit Delay, Continuous Time Integrator, and Bus Creator blocks, among others. A model also may include one or more subsystems, such as Function call subsystems, Enabled subsystems, etc. and/or one or more sub-models. At least some of the blocks may have one or more parameters. A mathematical parameter may be a block parameter that is used to compute an output of a block. For example, a Gain parameter of a Gain block is a mathematical parameter. Parameters that are not used to compute a block's output, such as a block name parameter, a block color parameter, a block position parameter, etc., may be referred to as a block configuration parameters. In addition, a tunable block parameter may refer to a block parameter whose value may be changed during simulation of the model without recompiling the model.

Model-level parameters may include one or more optimization parameters, such as a Block Reduction parameter which may determine whether a block reduction optimization is enabled or not for the model, a Fixed Step parameter which specifies a fixed-step size for the model, a Minimum Step parameter which specifies a minimum step size for a solver, a model Name parameter, a Parent model name parameter which specifies the name of the model or subsystem that owns this model, a Solver parameter which specifies the solver used for simulation of the model, etc. In addition, at least some of these parameters may also be specified at the block or object level, and/or the subsystem level.

Model-level parameters, block or object-level parameters and signal-level parameters may be set to respective values, such as default values, user-specified values, programmatically determined values, etc. Particular model elements, such as graphical objects, model parameters, block parameters, etc. may relate to different ones of the model traits, and a relationship between various model elements and model traits may be determined, as indicated at block 204. Different groups of model elements may be selected and associated with the identified model traits, as indicated at block 206.

For example, a determination may be made regarding which block parameters affect the behavior trait of the model. The gain parameter of a Gain block may affect the behavior trait of a model, while the name parameter of the Gain block does not affect the behavior trait. Other examples of model elements include model characteristics, such as the number and kind of blocks included in the model and the relationships established between them, model configuration preferences, such as solver selection, data import/export settings, optimization and diagnostics settings and model referencing settings. Other model elements may include block parameters, state element parameters or settings, physical system modeling object parameters or settings, etc.

FIGS. 3A and 3B are a highly schematic illustration of the association record 300, which associates model elements with model traits. The association record 300 may be organized as a table or array having rows and columns whose intersections define cells for storing information or data. In particular, the association record 300 may include a plurality of rows 302*a-v*, and each row may correspond to a particular model element. At least some of the columns of the association record 300 may correspond to different model traits. For example, the cells corresponding to a first column 304 may indicate which model elements as set forth in the rows 302 are associated with the behavior trait. The cells corresponding to a second column 306 may indicate which model elements are associated with the software architecture trait. The cells corresponding to a third column 308 may indicate which model elements are associated with the simulation trait. The cells corresponding to a fourth column 310 may indicate which model elements are associated with the code generation trait. The cells corresponding to a fifth column 312 may indicate which model elements are associated with the hardware implementation trait. The cells corresponding to a sixth column 314 may indicate which model elements are associated with the model requirements trait. The cells corresponding to a seventh column 316 may indicate which model elements are associated with the visual representation trait. An 'X' in a cell may indicate that the respective model element is associated with the respective model trait.

For example, the gain parameter of a gain block, and the constant parameter of a constant block of rows 302*a*, 302*b*, which are particular block parameters, are associated with the behavior and the simulation traits. The block spatial coordinates and block size elements of rows 302*c*, 302*d*, which are also block parameters, are associated with the visual representation trait. The particular solver selected for a model and the simulation start and stop times of rows 302*e*-302*g*, which are model parameters, are associated with the behavior and the simulation traits. The block reduction optimization setting and the signal storage reuse optimization setting of rows 302*h*, 302*i* are associated with the simulation and the code generation traits. The hardware device vendor name and the hardware device type of rows 302*j*, 302*k* are associated with the hardware implementation trait, while the processor type of row 302*l* is associated with the code generation trait. The number of bits—integer, and the number of bits—character of rows 302*m*, 302*n* are associated with the code generation and the hardware implementation traits. The HDL language setting of row 302*o* is associated with the hardware implementation trait, while the generate traceability report setting and the generate resource utilization report setting of rows 302*p*, 302*q* are associated with the code generation and the hardware implementation traits. The generate stack usage report of row 302*r* is associated with the code generation trait. It may also be associated with the report trait (not shown in figure). The reset type (synchronous or asynchronous) of row 302*s* is associated with the hardware implementation trait. The requirements document path name, link from model object to requirements document and internal requirements document link of rows 302*t-v* (FIG. 3B) are associated with the model requirements trait.

It should be understood that the association record 300 is meant for illustrative purposes and that one or more other or different, and possibly much larger, association records may be created. In addition, other association records 300 may be created that establish different associations between model elements and traits. As indicated, one or more association records 300 having predefined, e.g., default, associations may be included with (or be accessible by) the version control unit 116. Nonetheless, the association record 300 may be editable, e.g., by a user, to modify and/or expand on the associations between model elements and traits. In an embodiment, the association record 300 may be placed under version control. In a further embodiment, the version of the association record 300 utilized with a model may be another model trait.

In an embodiment, the modeling environment 100 may include a single, e.g., a default, association record 300 that may be used for all models created and/or opened in the modeling environment 100. Alternatively, the version control unit 116 may permit a user to create a custom association record 300 for a particular model 126. The custom association record 300 may be stored with the model 126. For example, the custom association record 300 may be configured as a model property.

In an embodiment, one or more modules, such as add on tools, of the modeling environment 100 may register with the version control unit 116 and, as part of the registration process, identify one or more model elements to be associated with one or more of the model traits. For example, the simulation engine 106 may identify one or more model elements to the version control unit that should be associated with the behavior trait. As another example, the code generator 130 may register with the version control unit 116, and identify one or more model elements that should be associated with the code generation trait. As yet another example, the model verifier 138 may register with the version control unit 116, and identify one or more model elements that should be associated with the verification trait.

In another embodiment, a user may specify the association of one or more model elements to model traits. For example, the HMI engine 102 may present a dialog box that lists at least some model elements. The user may select one or more of the model elements and associate them with a desired model trait. The HMI engine 102 also may present a dialog box for a selected model element of a model, such as a block or icon. The dialog box may present one or more features of the model element, and may allow those features to be associated with one or more traits. In addition, the association of features to traits selected for a given block may be used as a prototype for all instances of that block type within the model. Additionally or alternatively, the association may be restricted to a particular hierarchical level of the model, such as all block types within a subsystem or sub-model.

Returning to FIG. 2, the version control unit 116 may be configured to create and maintain a separate version history for the identified model traits for at least some of the models constructed and/or executed in the modeling environment 100, as indicated at block 208.

Operation of Multiversioning System

Figure 4A:
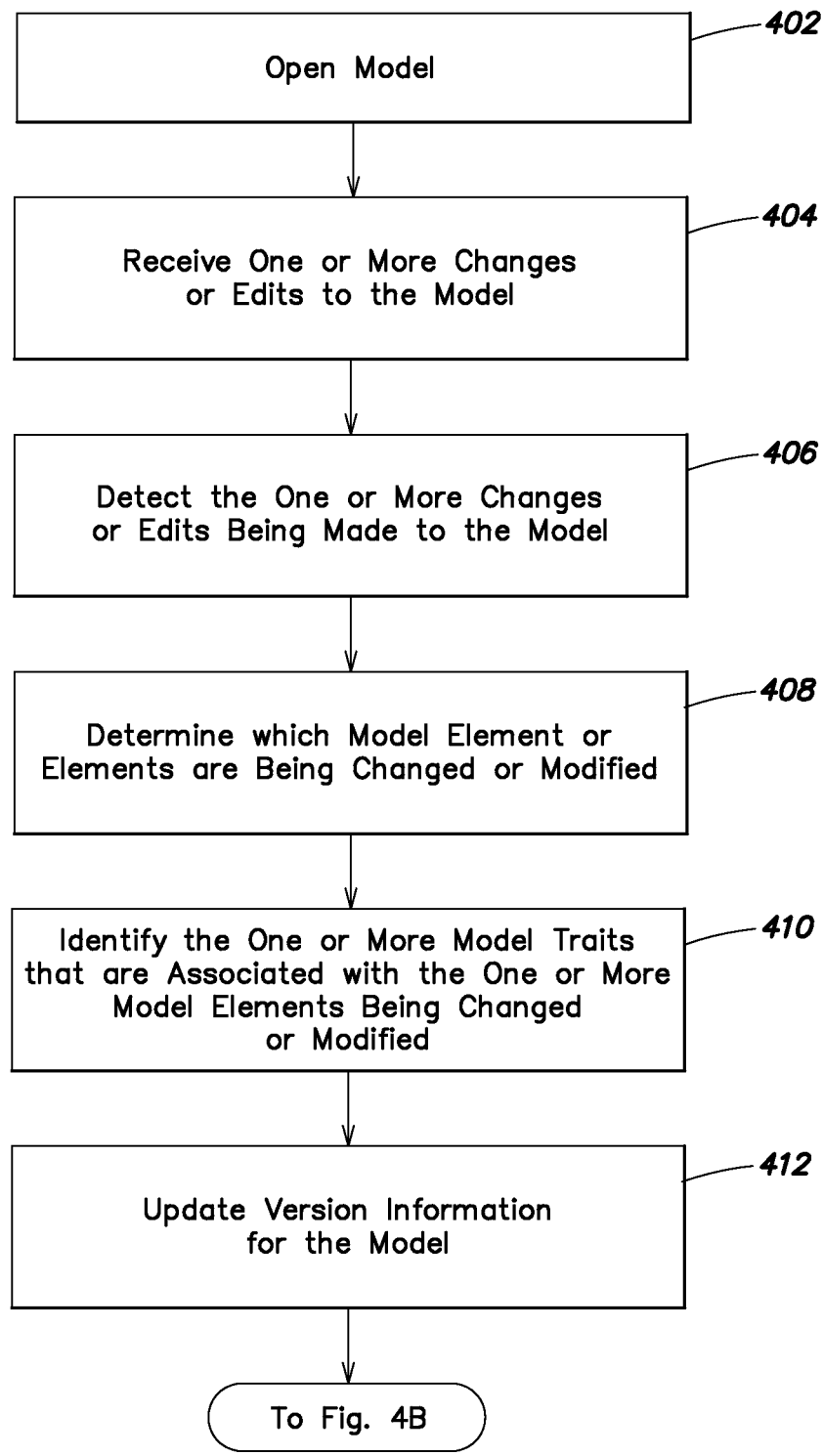
FIGS. 4A and 4B is a flow diagram of a method in accordance with an embodiment of the invention.
Figure 4B:
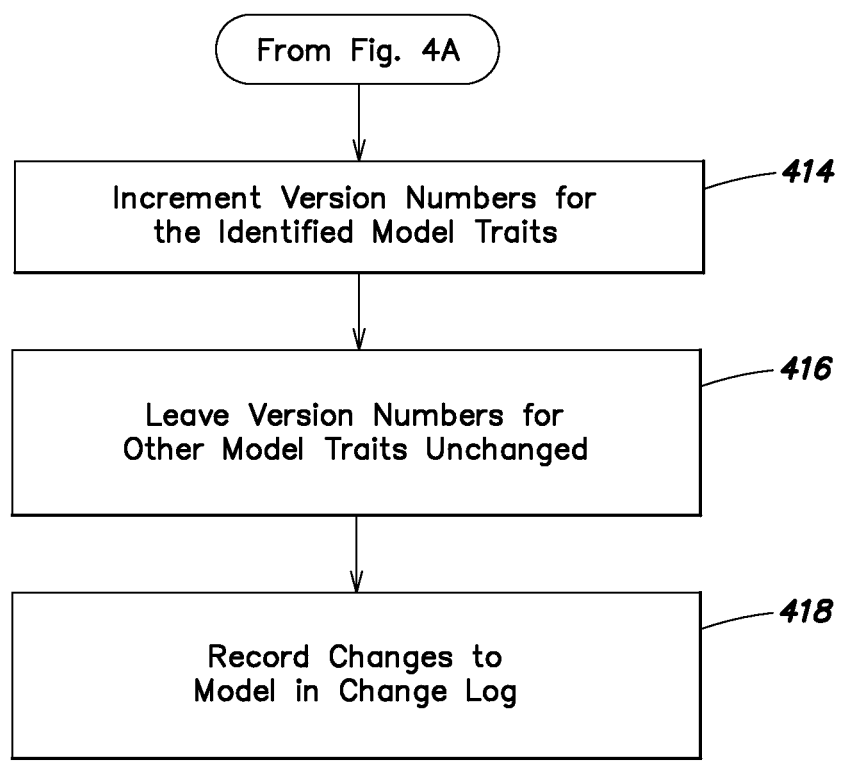

FIGS. 4A and 4B is a flow diagram of a method in accordance with an embodiment of the invention.

A given model, such as model 126*a*, may be opened within the modeling environment 100, as indicated at block 402. In an embodiment, the HMI engine 102 may create an interface, such as a graphical user interface (GUI), which may be presented on a display of a data processing device, such as a workstation, a laptop computer, a tablet computer, etc. The GUI may include a model canvas, a toolbar, and a command bar, among other user interface elements, and may be operated by a user. The user may open the given model 126*a* by using one or more command buttons and/or menu items. The given model 126*a* may be presented within the model canvas to the user. The given model may be rendered on the screen based on visual depiction information stored with the given model. One or more changes or edits may be made to the given model 126*a*, as indicated at block 404. For example, a user may add or remove one or more objects, such as blocks, may change one or more model and/or block parameters, etc.

The model analyzer 118 of the version control unit 116 may detect the one or more changes or edits being made to the given model 126*a*, as indicated at block 406. The model analyzer 118 may determine which element or elements of the given model 126*a* are being changed or edited, as indicated at block 408. The model analyzer 118 may determine the one or more traits of the given model 126*a* to which the one or more elements being changed or edited are associated, as indicated at block 410. For example, upon determining which model element or elements are being changed, the model analyzer 118 may access the association record 300 to identify the one or more model traits associated with the one or more model elements being changed.

The version control unit 116 may update the version information 128 for the given model 126*a*, as indicated at block 412. In an embodiment, the version control unit 116 may increment the version number for the model traits to which the one or more model elements being changed or edited are associated, as indicated at block 414 (FIG. 4B). The version control unit 116 may leave unchanged the version numbers for the model traits that are not associated with one or more model elements being changed or edited, as indicated at block 416. In an embodiment, the model may be stored as a single storage object, such as a file, in the model repository 124. Nonetheless, the version control unit 116 is configured to associate different version numbers for the different model traits with the model stored as a single file. In a further embodiment, information concerning different versions of one or more model traits may be stored in a single storage object, such as a file, that does not include the entire model and/or all of the traits.

The version control unit 116 also may record the changes to the given model 126*a* in a change log 122, such as change log 122*a*, associated with the given model 126*a*, as indicated at block 418.

FIG. 5 is a schematic illustration of the version information 128 for the given model 126*a* before the one or more elements are changed or edited. The version information 128 may be organized as a table or array having rows and columns whose intersections define cells for storing information or data. In particular, the version information 128 may include a plurality of rows 502*a-g* and each row may correspond to one of the model's traits. The cells corresponding to a first column 504 may include a name of the model trait, and the cells corresponding to a second column 506 may include a version number. The first row 502*a* corresponds to the behavior trait for which the current version is 1.7. The second row 502*b* corresponds to the software architecture trait for which the current version is 1.1. The third row 502*c* corresponds to the simulation trait for which the current version is 1.8. The fourth row 502*d* corresponds to the code generation trait for which the current version is 2.4. The fifth row 502*e* corresponds to the hardware implementation trait for which the current version is 2.1. The sixth row 502f corresponds to the model requirements trait for which the current version is 1.0. The seventh row 502g corresponds to the visual representation trait for which the current version is 1.0.

Suppose the one or more changes to the given model 126a are to model elements that are associated with the code generation trait and the hardware implementation trait. In this case, the version control unit 116 increments the version numbers for these model traits, while leaving the version numbers for the other model traits unchanged.

FIG. 6 is a schematic illustration of the revised version information 128' for the given model 126a after the one or more elements are changed. As illustrated, the version number for the code generation trait, as provided in the fourth row 502d, has been incremented from 2.4 to 2.5, and the version number for the hardware implementation trait, as provided in the fifth row 502e, has been incremented from 2.1 to 2.2. The version numbers for the other model traits, i.e., behavior, software architecture, simulation, and model requirements, as provided in rows 502a-c and 502f, are left unchanged. However, as described herein, an overall configuration version for the model may be incremented.

Checking Out a Desired Version

Figure 7A:
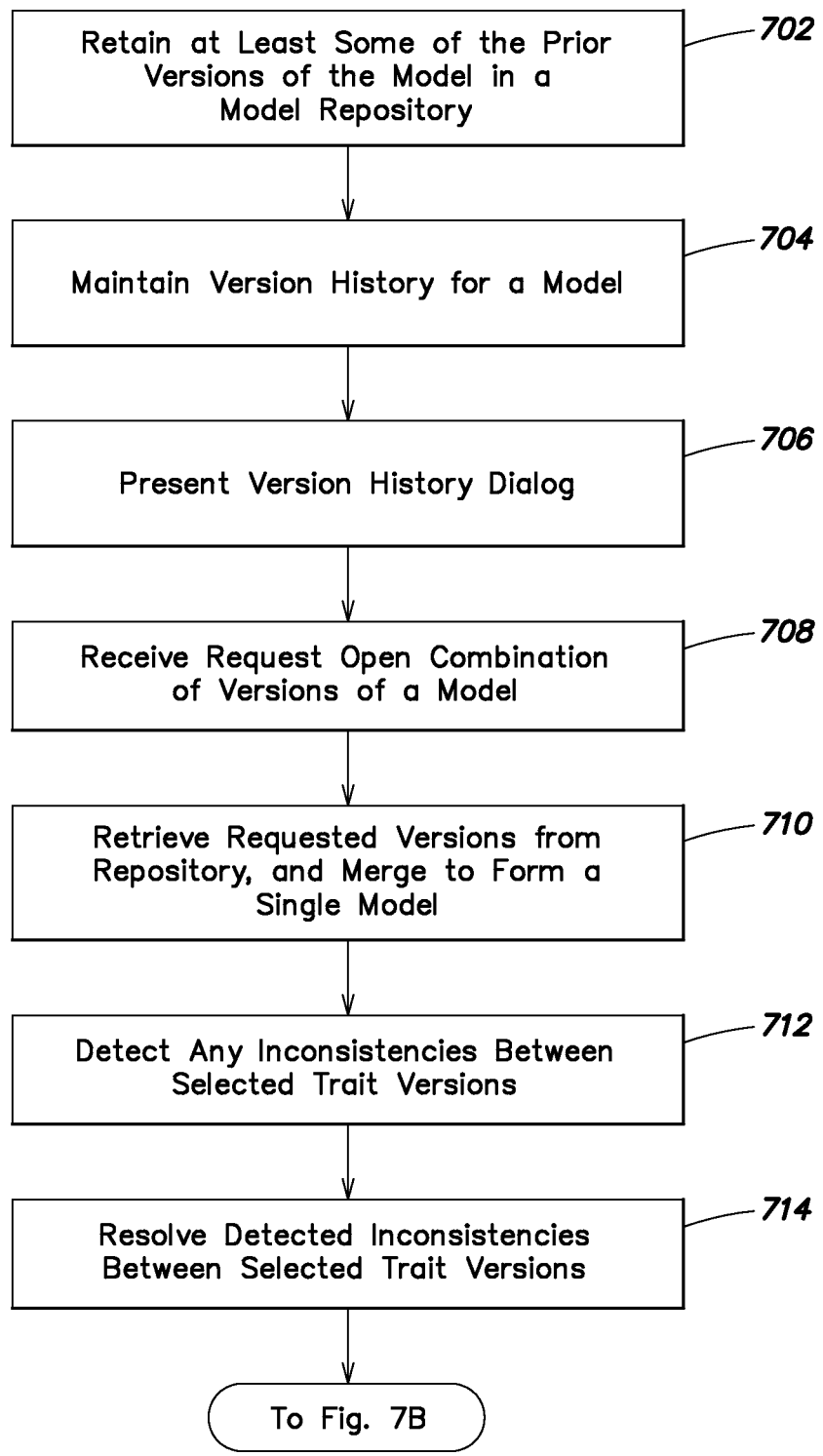
FIGS. 7A and 7B is a flow diagram of a method in accordance with an embodiment of the invention.
Figure 7B:
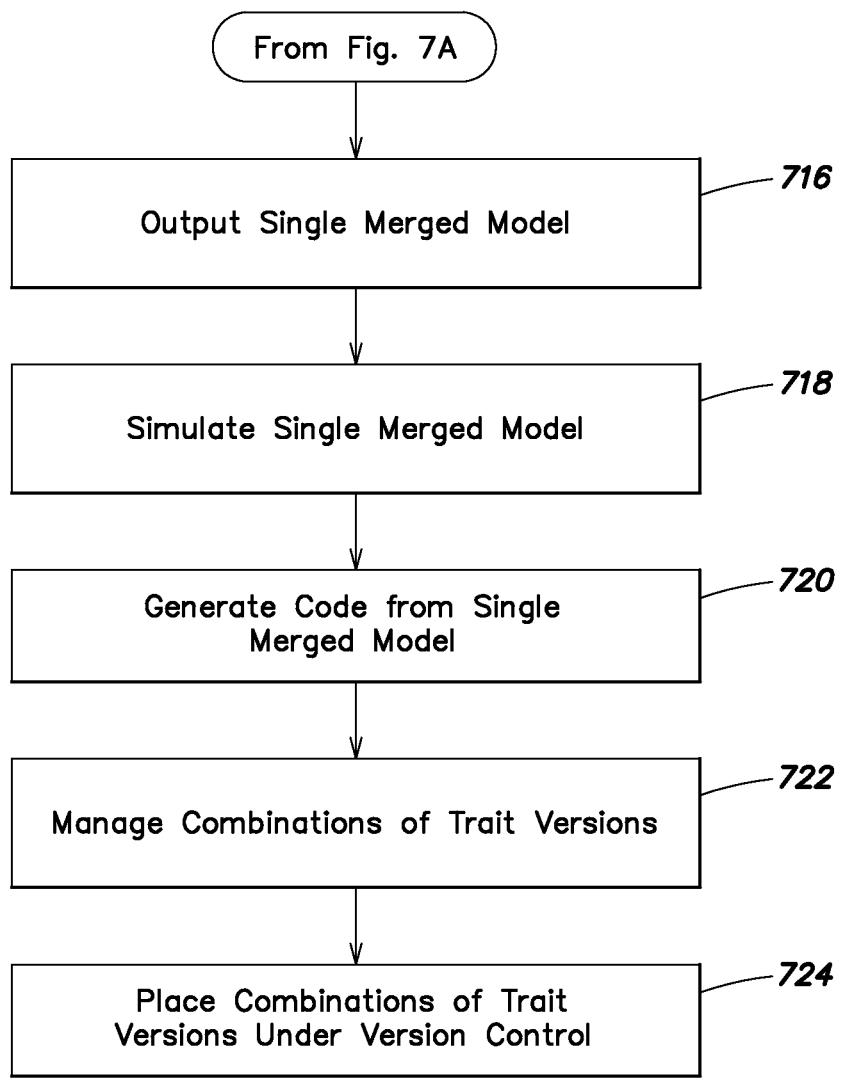

FIGS. 7A and 7B is a flow diagram of a method in accordance with an embodiment of the invention. The version control unit 116 may be configured to retain at least some of the prior versions of a model, as indicated at block 702. In particular, as changes or edits are made to a model, and the version numbers associated with the model traits are incremented, the version control unit 116 may cause copies of the model as it existed in prior versions to be retained in the model repository 124. The version control unit 116 also may be configured to maintain a version history for the model 126, as indicated at block 704. The version history may include an indication of the versions that have been saved for the model 126.

The HMI engine 102 may be configured to present a version history graphical affordance, such as a dialog or window, to a user, as indicated at block 706. For example, a command button or menu item may be provided in the GUI and, in response to the command button or menu item being selected, the HMI engine 102 may present the version history dialog on the display for review by the user.

Figure 8:
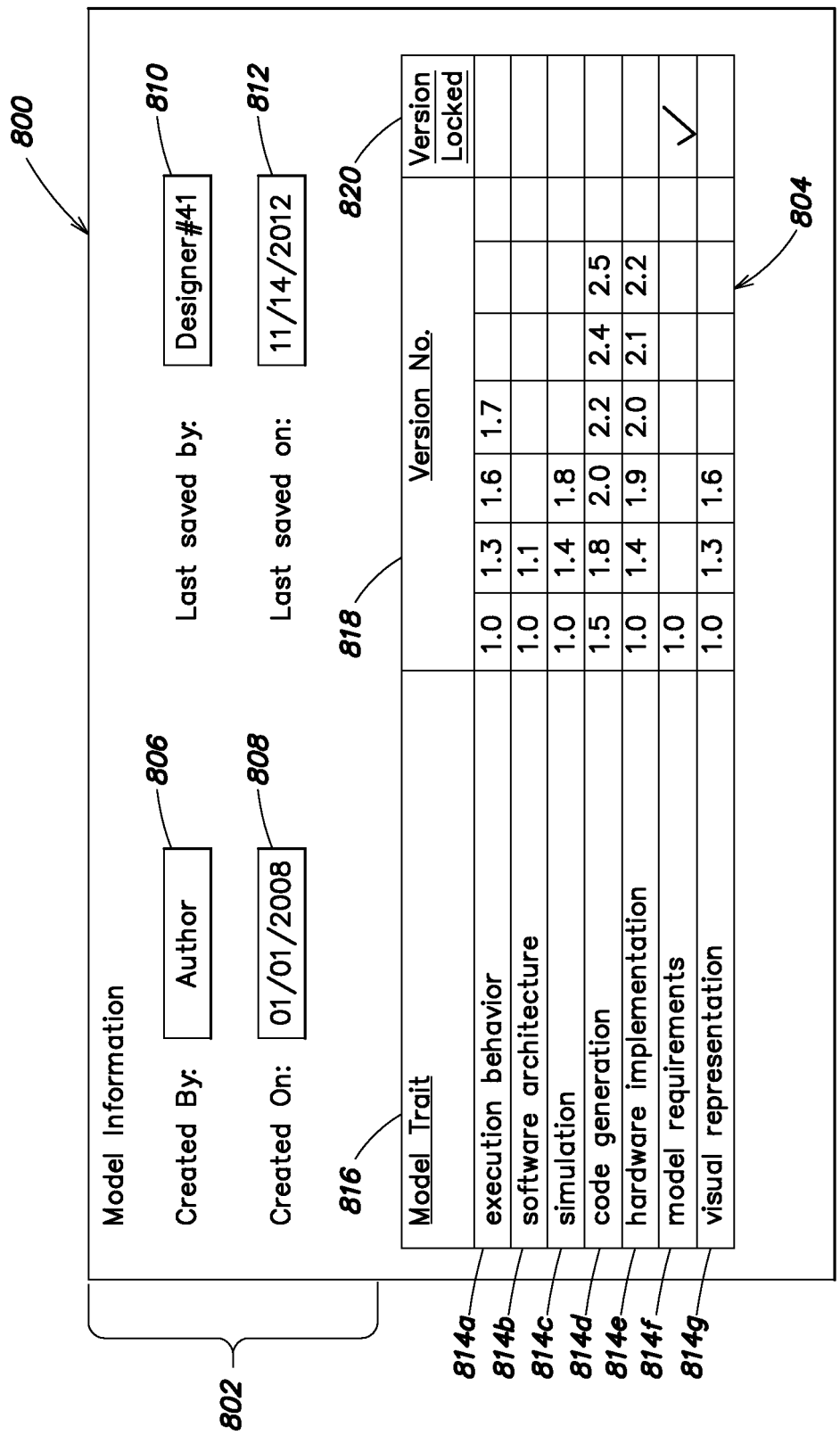
FIG. 8 is a schematic illustration of a version history record for a model in accordance with an embodiment of the invention.

FIG. 8 is a schematic illustration of a version history dialog 800 created for a model. The dialog 800 may include a model information portion 802 and a version history record 804. The model information portion 802 may include a plurality of fields. For example, it may include an author name field 806 that may present the name of the person who created the model 126, and a first date field 808 that may present the date on which the model was created. The model information portion 802 also may include an editor name field 810 that may present the name of the last person to save the model 126, and a second date field 812 that may present the date on which the model 126 was last saved.

The version history record 804 may be organized as a table or array having rows and columns whose intersections define cells for storing information or data. In particular, the version history record 804 may include a plurality of rows 814a-g, and each row may correspond to one of the model's traits. The cells corresponding to a first column 816 may include a name of the model trait. The cells corresponding to a second column 818 may include a list of the version numbers for the versions of the model for that model trait that have been saved in the model repository 124. For example, row 802a indicates that copies of the model corresponding to version numbers 1.0, 1.3, 1.6 and 1.7 of the behavior trait have been saved. Row 802b indicates that copies of the model corresponding to version numbers 1.0 and 1.1 of the software architecture trait have been saved, and so on. The cells corresponding to a third column 820 may indicate whether the most recent version of the model trait is locked against editing.

In an embodiment, at least some if not all of the versions represented by rows 814 of the version history record 804 may further include the name of the author of the version, the date the version was created, the name of the person who it was last saved by, and the date it was last saved.

The version control unit 116 may receive a request to open a version of the model that represents one or a combination of prior versions for one or more of the model's traits, as indicated at block 708. For example, upon reviewing the version history record 800, a user may choose to open a version of the model that represents a combination of versions for different traits of the model. The user may choose to open a version of the model that has version 1.3 of the model's behavior trait, version 1.0 of the model's software architecture trait, version 1.8 of the model's simulation trait, version 1.8 of the model's code generation trait, version 2.0 of the model's hardware implementation trait, and version 1.0 of the model's model requirements trait. The merge engine 136 may retrieve the specified versions from the model repository 124, and construct a single model that represents the selected versions, as indicated at block 710. In an embodiment, the merge engine 136 may construct the single model based on information contained in the change log 122 for the model.

The merge engine 136 may be configured to detect whether any inconsistencies exist between the various selected trait versions, as indicated at block 712. The merge engine 136 also may be configured to resolve the identified inconsistencies, as indicated at block 714. More specifically, the merge engine 136 may be configured to apply one or more rules to resolve identified inconsistencies in selected trait versions. For example, priorities may be assigned to the traits, and the conflict may be resolved in favor of the trait having the higher priority. The behavior trait may be assigned the highest priority. In another example, the merge engine 136 may be configured to revert to default values in case of an inconsistency. In yet another example, if the inconsistency results from the deletion of a portion of a model as compared to an earlier version, the inconsistency may be ignored.

The single model may be presented to the user, as indicated at block 716 (FIG. 7B). The user may simulate, e.g., execute, the single model, as indicated at block 718. Alternatively or additionally, the user may generate software code from the single model, as indicated at block 720. Other actions may include generating hardware code, transform the model, e.g., remove Gain blocks with a value of 1, replace selected patterns with a single block, etc., generate and print or save a model report, determine the complexity of the model, e.g., the number of blocks, the number of nested decision points in a state transition diagram, etc., prove properties of the model, e.g., by static analysis, and associate requirements with model elements, among other actions.

The combination of different trait versions may be managed by the trait configuration manager 117, as indicated at block 722, and the combinations may themselves be subject to version control by the version control unit 116, as indicated at block 724. For example, the trait configuration manage 117 may maintain an overall configuration management record for a model.

FIG. 12 is a schematic illustration of an overall configuration management record 1200. The record may be presented in its own graphical affordance or may be included in another graphical affordance, such as the version history dialog 800 (FIG. 8). The configuration management record 1200 may be organized as a table or array having rows and columns whose intersections define cells for storing information or data. In particular, the configuration management record 1200 may include a plurality of rows 1202*a-d*, and each row may correspond to a model version created from a combination of version traits. The cells corresponding to a first column 1204 may indicate an overall configuration version number, while the cells of the other columns may indicate the versions of the respective traits included in that overall configuration version number. In particular, the cells corresponding to a second column 1206 may indicate the behavior trait version number. The cells corresponding to a third column 1208 may indicate a software architecture version number. The cells corresponding to a fourth column 1210 may indicate a simulation version number. The cells corresponding to a fifth column 1212 may indicate a code generation version number. The cells corresponding to a sixth column 1214 may indicate a hardware implementation version number. The cells corresponding to a seventh column 1216 may indicate a model requirements version number. In an embodiment, each row 1202 may also include the name of the author, the date on which the overall configuration was created, the person who last saved the overall configuration, and the date on which it was last saved. In addition, one or more of the overall configurations may be locked.

Selection of Trait Versions

The HMI engine 102 may be configured to present one or more graphical affordances, such as dialog boxes, through which a user may select one or more desired trait versions when opening a model and/or through which a user may specify desired trait versions for one or more model components, such as a subsystem or a sub-model.

Figure 13:
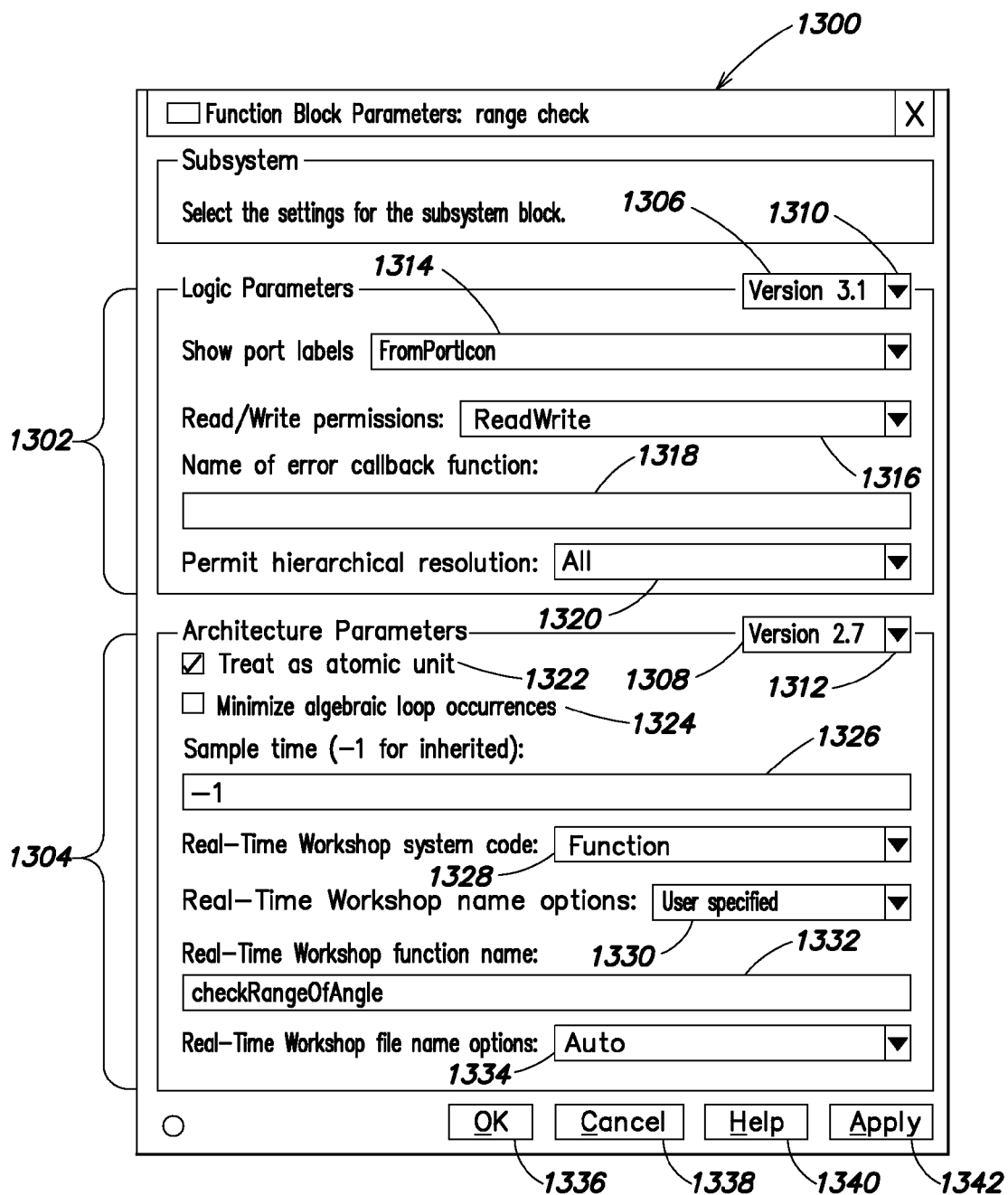
FIG. 13 is a schematic illustration of a user interface element in accordance with an embodiment of the invention.

FIG. 13 is a schematic illustration of a selection dialog 1300 for selecting trait versions for a subsystem of a model. The selection dialog 1300 may include a separate area for each trait. For example, the selection dialog 1300 may include a first area 1302 that corresponds to a logic trait, and a second area 1304 that corresponds to an architecture trait. Each area 1302, 1304 may include a user interface element, such as a drop down box, for selecting a desired version for that trait. In particular, the first area 1302 includes a 'Logic Parameters' drop down box 1306 for selecting the desired logic version number, and the second area includes an 'Architecture Parameters' drop down box 1308 for selecting the desired architecture version number. The drop down boxes 1306, 1308 may include command buttons, such as drop down arrows 1310, 1312, that, if selected, present the version numbers available for selection to the user. As indicated in FIG. 13, the user has selected logic trait version number 3.1, and architecture trait version number 2.7. The areas 1302, 1304 also may present values for at least some of the model elements that are associated with the respective model traits. Some of these values may be user editable. For example, the values may be presented in data entry boxes that may be edited by the user, drop down boxes, which allow the user to select one of a plurality of available values, checkboxes, etc.

For example, the first area 1302, which corresponds to the logic trait, includes a 'show port labels' drop down box 1314, a Read/Write permissions' drop down box 1316, a 'Name of error callback function' data entry box 1318, and a 'Permit hierarchical resolution' drop down box 1320. These elements have been associated with the logic trait. The second area 1304, which corresponds to the architecture trait, includes a 'Treat as atomic unit' checkbox 1322, a 'Minimize algebraic loop occurrences' checkbox 1324, a 'Sample time' data entry box 1326, a 'Real-Time Workshop system code' drop down box 1328, a 'Real-Time Workshop function name options' drop down box 1330, a 'Real-Time Workshop function name' data entry box 1332, and a 'Real-Time Workshop file name options' drop down box 1334. The term 'Real-Time Workshop' may refer to a source code generation tool for the modeling environment 100.

By manipulating the information presented by the user-editable interface elements of the selection dialog 1300, a user may alter the values of one or more model elements associated with a trait, such as the logic or architecture traits, without changing the version number for that trait.

The locking engine 120 may be configured to lock one or more of the model elements from editing. In this case, the locked elements may appear grayed out by the HMI engine 102, thereby blocking the user from making any changes to the values assigned to those model elements.

The selection dialog 1300 also may include one or more command buttons, such as an OK button 1336, a Cancel button 1338, a Help button 1340, and an Apply button 1342. Once the user has selected the desired trait version numbers, and changed any of the model element parameter values, the user may select the OK or Apply buttons 1336, 1342. The version control unit 116 may retrieve and load the selected version. For example, to the extent the user selects one or more versions numbers for traits of a subsystem, the version control unit 116 may load the selected subsystem when opening and/or loading a model containing that subsystem. As another example, the user may open a model and select one or more version numbers for model traits. In response, the version control unit 116 may modify the model so that the model element values associated with the selected model traits conform to the one or more version numbers for the selected model traits.

It should be understood that the selection dialog 1300 is meant for illustrative purposes, and that other graphical affordances may be used. Similar graphical affordances, such as dialogs, may be presented for selecting an overall configuration number for a model and/or one or more model trait versions.

Locking a Version

Figure 9A:
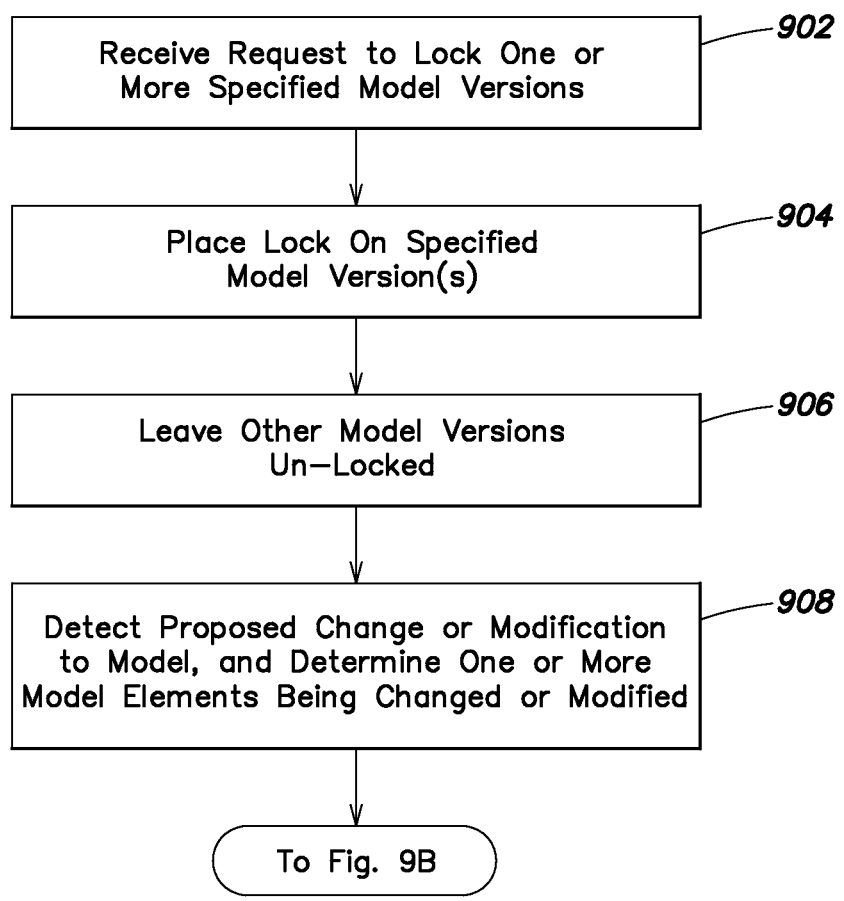
FIGS. 9A and 9B is a flow diagram of a method in accordance with an embodiment of the invention.
Figure 9B:
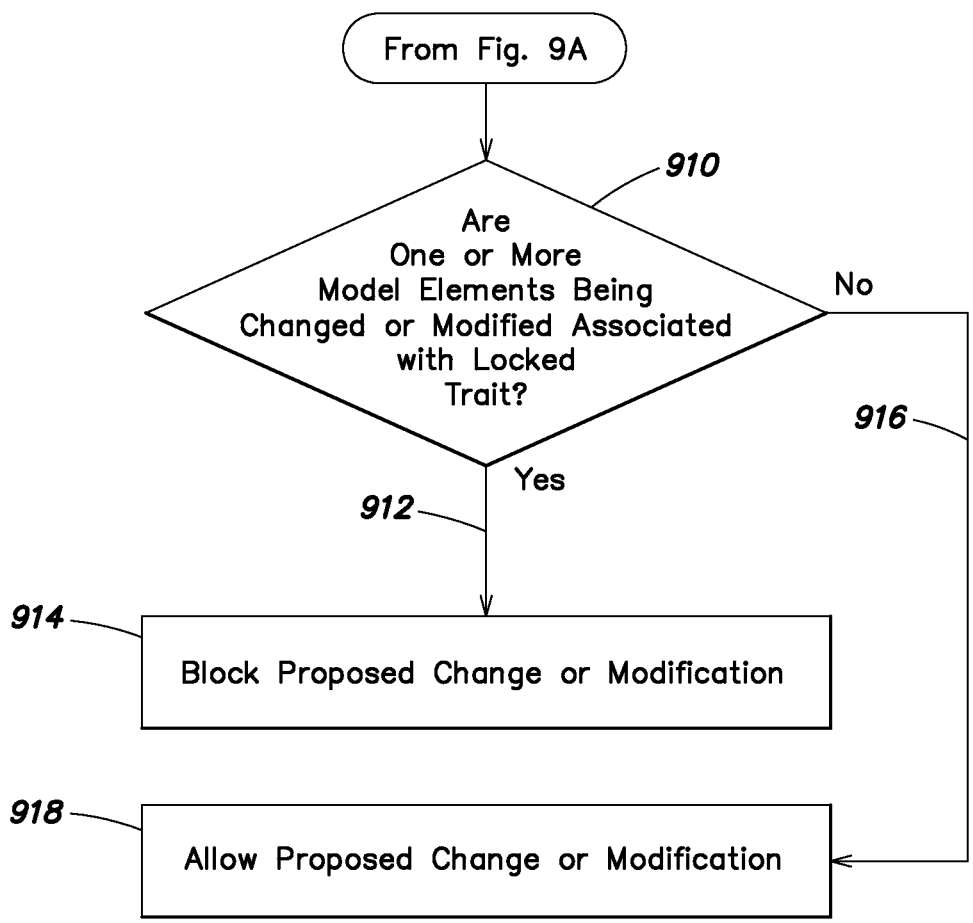

FIGS. 9A and 9B is a flow diagram of a method in accordance with an embodiment of the invention. The version control unit 116 may receive a request to lock one of the model versions, as indicated at block 902. For example, a project manager may determine that the current version of the model for a particular trait, such as the model requirements trait, should be locked. The GUI may include one or more command buttons or menu items for locking the version of the model associated with a particular trait, such as checkboxes within the version locked column 820 of the version history dialog 800. The project manager may check the box for a particular model trait, such as the model requirements trait. The locking engine 120 may place a lock on the model, as indicated at block 904. The lock, however, may only apply to the designated model traits; other model versions associated with other model traits may remain unlocked, as indicated at block 906. That is, the locking engine 120 may only lock from editing those model elements that, if changed, would cause the version number for that trait to be incremented. Other model elements that are associated with other model traits may still be edited by the user or other users.

Thereafter, if a change or edit is proposed to the model 126, the locking engine 120 may identify which model element or elements are being changed, as indicated at block 908. The locking engine 120 may determine if the identified model element or elements being changed are associated with the locked model trait, e.g., the model requirements trait, as indicated at decision block 910 (FIG. 9B). If the element or elements are associated with the locked model trait, the locking engine 120 may block the proposed change or edit to the model, as indicated by Yes arrow 912 leading to block 914. If the element or elements are not associated with the locked model trait, the locking engine 120 may permit the proposed change to be made, as indicated by No arrow 916 leading to block 918. Alternatively, if the model element or elements being changed are associated with the locked model trait, the locking engine 120 may allow the change to be made, but block the modified model from being saved. The user may still execute the modified model, generate code for the modified model, analyze the modified, etc. The user may also save the modified model as a new model.

Differencing Versions

Figure 10:
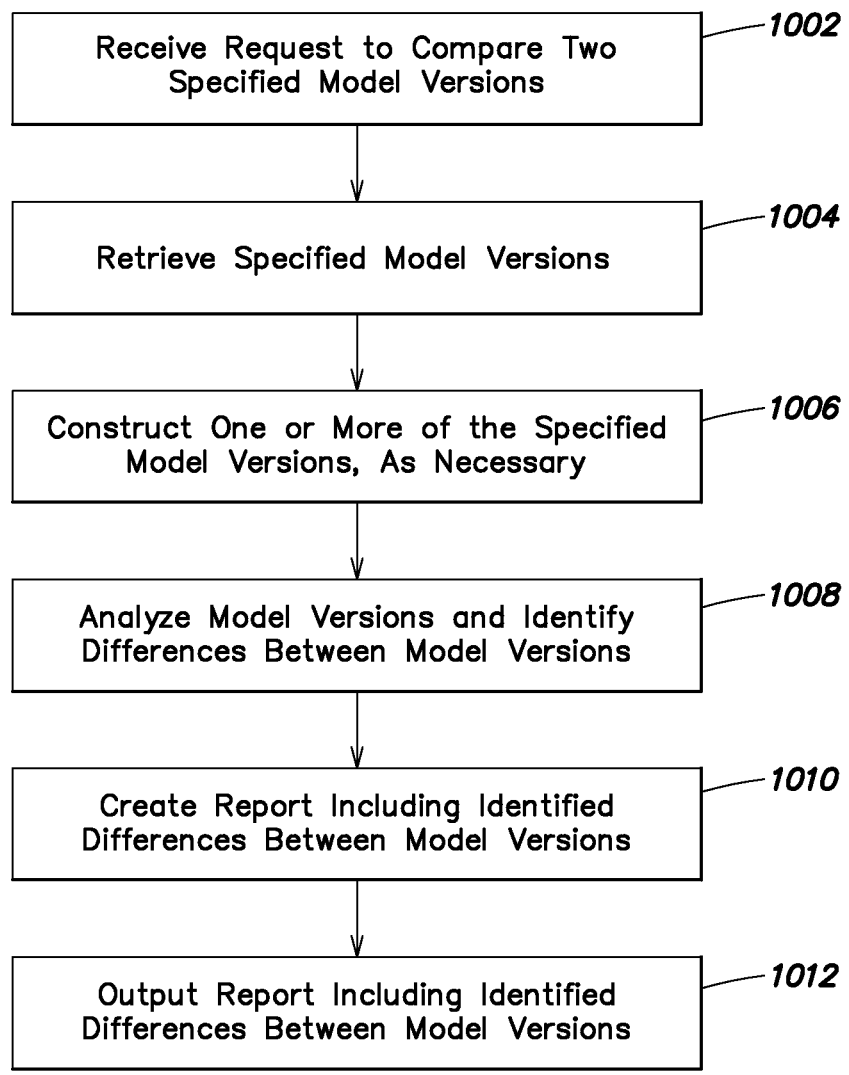
FIG. 10 is a flow diagram of a method in accordance with an embodiment of the invention.

FIG. 10 is a flow diagram of a method in accordance with an embodiment of the invention. The differencing engine 134 may receive a request to compare two versions of a model, such as two overall configuration versions, which themselves include different trait versions, as indicated at block 1002. For example, a user may be interested in determining the differences between two versions of a model. The GUI may include one or more command buttons or menu items for identifying two version of a model to be compared. In an embodiment, a user may want to compare two versions associated with a particular trait. For example, the user may want to compare version numbers 1.7 and 1.3 of the behavior trait. The user may select the command buttons or menu items, and may specify the two versions that are to be compared. For example, the user may select two overall configuration versions for comparison, and the two overall configuration versions may include behavior versions 1.3 and 1.7, respectively. The user may specify that only the behavior versions are to be compared. The HMI engine 102 may present a graphical affordance, such as a dialog or a list, through which a user may select the overall configuration versions to be compared, and the traits to be compared.

The differencing engine 134 may retrieve the two models from the model repository 124, as indicated at block 1004. In an embodiment, the identification of model elements associated with the various traits may be stored separately from the model with links back to the corresponding parameter values in the model. In a further embodiment, additional model content, such as model and/or block parameters, blocks, connections among model objects, entities, relations among model objects and/or entities, attributes, etc., may be stored separately from the model. In another embodiment, the values for the model elements associated with different traits may be stored separately from the model, and may include identifiers. In these cases, the differencing engine 134 may only retrieve the information associated with the traits being compared, rather than the entire models.

To the extent one of the specified models is a combination of versions that was not stored by the trait configuration manager 117, the merge engine 136 may reconstruct the specified model, as indicated at block 1006. The differencing engine 134 may analyze the two model versions, and identify the differences between the two model versions, as indicated at block 1008. The differencing engine 134 may create a report containing the identified differences, as indicated at block 1010. The differencing engine 134 may output the report, as indicated at block 1012. For example, the report may be displayed on a screen to the user and/or printed.

To the extent a model 126 includes a component, such as a graphical model reference block, that refers to another model, multiple version numbers may be maintained for this referenced model. For example, another trait of a model may be a sub-model version trait. The sub-model version trait may include the overall configuration version numbers for sub-models included in a parent model. Alternatively, the versioning information for sub-models may be included in an existing trait, such as the behavior trait.

Illustrative Data Processing System

Figure 11:
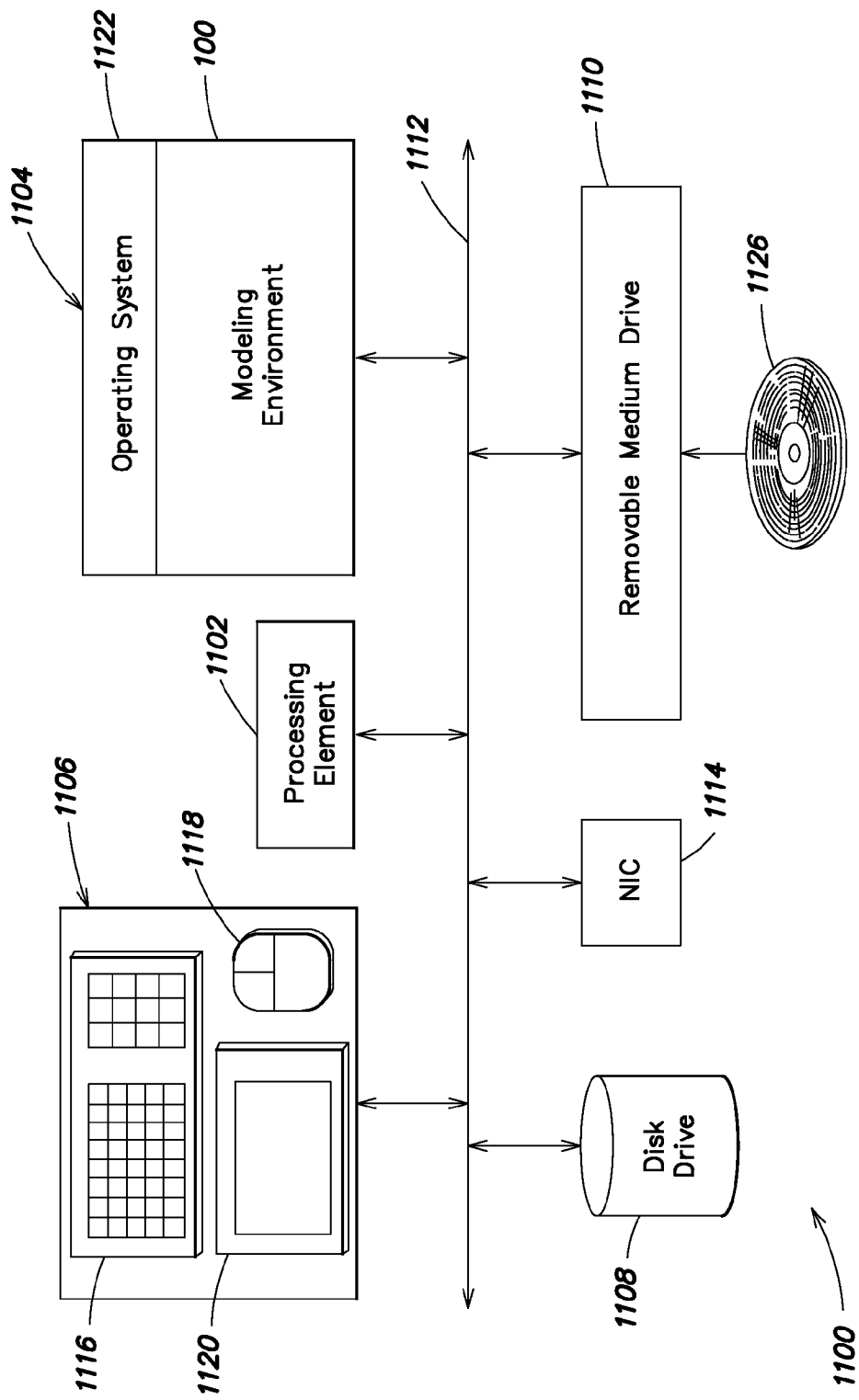
FIG. 11 is a functional block diagram of a data processing system in accordance with an embodiment of the invention.

FIG. 11 is a schematic illustration of a computer or data processing system 1100 for implementing an embodiment of the invention. The computer system 1100 may include one or more processing elements, such as a processing element 1102, a main memory 1104, user input/output (I/O) 1106, a persistent data storage unit, such as a disk drive 1108, and a removable medium drive 1110 that are interconnected by a system bus 1112. The computer system 1100 may also include a communication unit, such as a network interface card (NIC) 1114. The user I/O 1106 may include a keyboard 1116, a pointing device, such as a mouse 1118, and a display 1120. Other user I/O 1106 components include voice or speech command systems, other pointing devices include touchpads and touchscreens, and other output devices besides a display, include a printer, a projector, a touchscreen, etc. Exemplary processing elements include single or multi-core Central Processing Units (CPUs), Graphics Processing Units (GPUs), Field Programmable Gate Arrays (FPGAs), Application Specific Integrated Circuits (ASICs), microprocessors, microcontrollers, etc.

The main memory 1104, which may be a Random Access Memory (RAM), may store a plurality of program libraries or modules, such as an operating system 1122, and one or more application programs that interface to the operating system 1122, such as the modeling environment 100.

The removable medium drive 1110 may accept and read a computer readable medium 1126, such as a CD, DVD, floppy disk, solid state drive, tape, flash memory or other non-transitory medium. The removable medium drive 1110 may also write to the computer readable medium 1126.

Suitable computer systems include personal computers (PCs), workstations, servers, laptops, tablets, palm computers, smart phones, electronic readers, and other portable computing devices, etc. Nonetheless, those skilled in the art will understand that the computer system 1100 of FIG. 11 is intended for illustrative purposes only, and that the present invention may be used with other computer systems, data processing systems, or computational devices. The present invention may also be used in a networked, e.g., client-server, computer architecture, or a public and/or private cloud computing arrangement. For example, the modeling environment application 102 may be hosted on a server, and accessed by a remote client through an application hosting system, such as the Remote Desktop Connection tool from Microsoft Corp.

Suitable operating systems 1122 include the Windows series of operating systems from Microsoft Corp. of Redmond, Wash., the Android and Chrome OS operating systems from Google Inc. of Mountain View, Calif., the Linux operating system, the MAC OS® series of operating systems from Apple Inc. of Cupertino, Calif., and the UNIX® series of operating systems, among others. The operating system 1122 may provide services or functions for other modules, such as allocating memory, organizing data according to a file system, prioritizing requests, etc. The operating system 1122 may run on a virtual machine, which may be provided by the data processing system 1100.

As indicated above, a user or developer, such as an engineer, scientist, programmer, etc., may utilize one or more input devices, such as the keyboard 1116, the mouse 1118, and the display 1120 to operate the modeling environment 200, and construct one or more graphical skeleton components and/or one or more models that include one or more graphical skeleton components. As discussed, the graphical models may be computational and may have executable semantics. In particular, the models may be executable. In particular, the model may provide one or more of time-based, event-based, state-based, frequency-based, control-flow based, and dataflow-based execution semantics. The execution of a model may simulate operation of the system that is being designed or evaluated. The term graphical model, moreover, is intended to include graphical program.

The foregoing description of embodiments is intended to provide illustration and description, but is not intended to be exhaustive or to limit the invention to the precise form disclosed. Modifications and variations are possible in light of the above teachings or may be acquired from practice of the invention. For example, while a series of acts has been described above with respect to FIGS. 2, 4A-4B, 7A-7B, 9A-9B and 10, the order of the acts may be modified in other implementations. Further, non-dependent acts may be performed in parallel.

Also, the term "user", as used herein, is intended to be broadly interpreted to include, for example, a computing device (e.g., a workstation) or a user of a computing device, unless otherwise stated.

It will be apparent that one or more embodiments, described herein, may be implemented in many different forms of software and hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, certain embodiments of the invention may be implemented as "logic" that performs one or more functions. This logic may be hardware-based, software-based, or a combination of hardware-based and software-based. The logic may be stored in one or more tangible computer-readable storage media and may include computer-executable instructions that may be executed by processing logic, such as processing logic 120. The computer-executable instructions may include instructions that implement one or more embodiments of the invention. The tangible computer-readable storage media may be volatile or non-volatile and may include, for example, flash memories, dynamic memories, removable disks, and non-removable disks.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   establishing a plurality of separate and independent version numbers for a graphical model having executable semantics, where:
   the graphical model includes objects, object relationships, object parameters and model parameters, and
   the plurality of version numbers are associated with respective ones of a plurality of model traits of the graphical model;
   providing associations between one or more of the objects, object relationships, object parameters and model parameters and the plurality of model traits;
   storing the associations between the one or more of the objects, object relationships, object parameters and model parameters and the plurality of model traits in a memory;
   for at least one of the plurality of model traits, storing a plurality of different versions;
   identifying one or more of the objects, object relationships, object parameters and model parameters of the graphical model that have changed as compared to a prior version of the graphical model;
   determining, by a processor coupled to the memory, at least one model trait associated with the one or more objects, object relationships, object parameters and model parameters identified as having changed;
   updating the version number associated with the at least one model trait determined to be associated with the one or more objects, object relationships, object parameters and model parameters identified as having changed; and
   presenting, on a display coupled to the processor, one or more graphical affordances, the one or more graphical affordances configured to present at least some of the plurality of version numbers of the graphical model.

2. The method of claim 1 wherein the plurality of model traits includes two or more of:
   a behavior trait;
   a software architecture trait;
   a model simulation trait;
   a code generation trait;
   a hardware implementation trait;
   a model requirements trait;
   a visual representation trait;
   a verification trait;
   a requirements trait;
   a diagnostics trait; and
   a testing trait.

3. The method of claim 2 wherein
   the graphical model further includes visual depiction information, and
   the plurality of model traits further includes a visual representation trait.

4. The method of claim 1 further comprising receiving the graphical model at a version control unit.

5. The method of claim 4 further comprising saving at least part of the graphical model having a plurality of separate and independent version numbers in a single storage object at a repository coupled to the version control unit.

6. The method of claim 5 wherein the storage object is a file.

7. The method of claim 5 further comprising:
   receiving selected version numbers for at least some of the plurality of model traits; and
   retrieving from the repository the graphical model according to the selected version numbers for the at least some of the plurality of model traits.

8. The method of claim 1 wherein the association between a selected object, object relationship, object parameter or model parameter and a selected model trait is user-settable.

9. A method comprising:
   establishing a plurality of separate and independent version numbers for a graphical model having executable semantics, the graphical model including model characteristics, model configuration preferences, and block parameters that are modifiable;

organizing the model characteristics, model configuration preferences, and block parameters into groups where each group includes a set of model characteristics, model configuration preferences, and block parameters that, when one or more are modified, affect a respective model trait of the graphical model;

storing, for at least one model trait of the graphical model, a plurality of different versions;

identifying at least one set of model characteristics, model configuration preferences, and block parameters that have changed as compared to a prior version of the graphical model;

automatically determining, by a processor, a model trait of the graphical model affected by the change of the at least one set of model characteristics, model configuration preferences, and block parameters;

updating the version number associated with the model trait of the graphical model determined to be affected by the change;

storing, by a processor coupled to the memory, the updated version; and presenting, on a display coupled to the processor, one or more graphical affordances, the one or more graphical affordances configured to present at least some of the plurality of version numbers of the graphical model.

10. The method of claim 9 wherein the groups consist of disjoint sets of the model characteristics, model configuration preferences, and block parameters.

11. An apparatus comprising:
a display;
a memory configured to store
   a graphical model having executable semantics, the graphical model including objects, object relationships, object parameters and model parameters,
   an association between a plurality of model traits and selected combinations of the objects, object relationships, object parameters and model parameters, and
   a plurality of separate and independent version numbers for the plurality of model traits of the graphical model,
   a plurality of different versions for at least one of the plurality of model traits; and
a processor coupled to the memory and the display, the processor configured to
   detect a change to the graphical model, where the detected change involves at least one of the objects, object relationships, object parameters and model parameters,
   identify at least one model trait that is associated with the at least one of the objects, object relationships, object parameters and model parameters involved in the detected change,
   update the version number associated with the at least one model trait, and
   present, on the display, one or more graphical affordances, the one or more graphical affordances configured to present at least some of the plurality of version numbers of the graphical model.

12. The apparatus of claim 11 further comprising:
the processor is further configured to present the updated version number on the display.

13. The apparatus of claim 11 wherein the plurality of model traits includes two or more of:
a behavior trait;
a software architecture trait;
a model simulation trait;
a code generation trait;
a hardware implementation trait;
a model requirements trait;
a visual representation trait;
a verification trait;
a diagnostic trait;
a requirements trait; and
a testing trait.

14. The apparatus of claim 11 wherein the processor is further configured to store, for a given model trait, a current version of the graphical model and a prior version of the graphical model.

15. A non-transitory computer-readable medium comprising program instructions, the program instructions when executed by a processing element operable to:
establish a plurality of separate and independent version numbers for a graphical model having executable semantics, the graphical model including model characteristics, model configuration preferences, and block parameters, the plurality of version numbers associated with respective ones of a plurality of model traits of the graphical model;
store an association of sets of the model characteristics, model configuration preferences, and block parameters to the plurality of model traits;
store a plurality of different versions for at least one of the plurality of model traits;
identify one or more of the model characteristics, model configuration preferences, and block parameters that is changed as compared to a prior version of the graphical model;
identify, by a processor, at least one model trait associated with the one or more model characteristics, model configuration preferences, and block parameters identified as having changed;
update the version number associated with the at least one model trait identified as associated with the one or more model characteristics, model configuration preferences, and block parameters identified as having changed; and
present, on a display coupled to the processor, one or more graphical affordances, the one or more graphical affordances configured to present at least some of the plurality of version numbers of the graphical model.

16. The computer-readable medium of claim 15 wherein the plurality of model traits includes two or more of:
a behavior trait;
a software architecture trait;
a model simulation trait;
a code generation trait;
a hardware implementation trait;
a model requirements trait;
a visual representation trait;
a verification trait;
a diagnostics trait;
a requirements trait; and
a testing trait.

17. The computer-readable medium of claim 15 further comprising program instructions to:
save at least part of the graphical model having the plurality of separate and independent version numbers in a single storage object at a repository coupled to a version control unit.

18. The computer-readable medium of claim 17 wherein the storage object is a file.

* * * * *

UNITED STATES PATENT AND TRADEMARK OFFICE
CERTIFICATE OF CORRECTION

Page 1 of 1

PATENT NO.        : 9,047,165 B1
APPLICATION NO.   : 13/800877
DATED             : June 2, 2015
INVENTOR(S)       : Pieter J. Mosterman It is certified that error appears in the above-identified patent and that said Letters Patent is hereby corrected as shown below:

In the Specification:

Starting with Col. 4, line 65 and ending with Col. 5, line 8; delete paragraph and replace with:
The modeling environment 100 may include other components, such as a code generator 130, a target language compiler 132, a differencing engine 134, a merge engine 136, and a model verifier 138. The code generator 130 may be configured to generate computer programming code, such as source and/or object code, from a model. The target language compiler 132 may be configured to compile source code, such as source code generated by the code generator 130, into an executable form, such as one or more object code files or binaries, for execution by target platform or target hardware, such as a central processing unit (CPU), an embedded processor, a microcontroller, a Field Programmable Gate Array (FPGA), a Application Specific Integrated Circuit (ASIC), etc., of a data processing device. The differencing engine 134 may be configured to analyze two models, identify the differences between them, and generate a report that sets forth the identified differences. The merge engine 136 may be configured to construct a single merged model from two or more versions of a model automatically. The model verifier 138 may be configured to perform requirements tracing, modeling standards compliance checking, and test-harness generation, among other verification tasks.

Signed and Sealed this
Thirteenth Day of October, 2015

Michelle K. Lee
*Director of the United States Patent and Trademark Office*